(12) United States Patent
Wolf

(10) Patent No.: US 8,845,198 B2
(45) Date of Patent: Sep. 30, 2014

(54) TRANSMISSION WHEEL ARRANGEMENT

(71) Applicant: GM Global Technology Operations LLC, Detroit, MI (US)

(72) Inventor: Erwin Wolf, Oestrich-Winkel (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/779,287

(22) Filed: Feb. 27, 2013

(65) Prior Publication Data

US 2013/0279836 A1  Oct. 24, 2013

(30) Foreign Application Priority Data

Apr. 20, 2012  (DE) .......... 10 2012 007 972

(51) Int. Cl.
| | |
|---|---|
| F16C 19/38 | (2006.01) |
| F16C 19/56 | (2006.01) |
| F16H 57/022 | (2012.01) |
| F16C 19/54 | (2006.01) |
| F16H 57/00 | (2012.01) |
| F16C 19/50 | (2006.01) |

(52) U.S. Cl.
CPC .............. *F16H 57/022* (2013.01); *F16C 19/54* (2013.01); *F16C 2361/61* (2013.01); *F16C 19/381* (2013.01); *F16C 19/505* (2013.01); *F16C 2240/80* (2013.01); *F16H 57/0031* (2013.01)
USPC ............................. 384/455; 384/452; 384/594

(58) Field of Classification Search
CPC ...... F16C 19/48; F16C 19/381; F16C 19/545; F16C 21/00
USPC .......................... 384/416, 452, 454–456, 594
See application file for complete search history.

(56) References Cited

U.S. PATENT DOCUMENTS

| | | | | |
|---|---|---|---|---|
| 4,573,811 | A * | 3/1986 | Andree et al. ................ | 384/622 |
| 4,793,200 | A | 12/1988 | McDonald | |
| 4,861,171 | A * | 8/1989 | Adachi ......................... | 384/455 |
| 5,158,375 | A * | 10/1992 | Uchida et al. ................ | 384/455 |
| 5,829,890 | A * | 11/1998 | Bauer et al. .................. | 384/455 |
| 7,011,196 | B2 * | 3/2006 | Sudau ........................... | 192/3.29 |
| 7,291,082 | B2 * | 11/2007 | Tiesler .......................... | 475/198 |
| 7,637,664 | B2 * | 12/2009 | Kiyosawa et al. ............ | 384/452 |
| 2003/0121345 | A1 * | 7/2003 | Nett .............................. | 74/416 |
| 2008/0179155 | A1 * | 7/2008 | Frey et al. .................... | 192/3.25 |
| 2008/0285905 | A1 * | 11/2008 | Kiyosawa et al. ............ | 384/618 |
| 2010/0189388 | A1 * | 7/2010 | Draser ........................... | 384/563 |
| 2010/0313708 | A1 * | 12/2010 | Tatsuda ........................ | 74/813 R |

FOREIGN PATENT DOCUMENTS

| | | | | | |
|---|---|---|---|---|---|
| DE | 2738287 | A1 * | 8/1977 | | |
| DE | 3408044 | A1 * | 9/1985 | .............. | F16C 19/38 |
| DE | 4232563 | A1 * | 3/1994 | .............. | B23Q 1/08 |
| DE | 4238147 | A1 * | 5/1994 | .............. | F16C 21/00 |
| DE | 19625930 | A1 * | 1/1998 | .............. | F16C 19/34 |
| DE | 102006050002 | A1 | 4/2008 | | |
| DE | 102010007706 | A1 | 8/2011 | | |
| DE | 102011004975 | A1 * | 9/2012 | | |

(Continued)

*Primary Examiner* — Marcus Charles
(74) *Attorney, Agent, or Firm* — Ingrassia Fisher & Lorenz, P.C.

(57) ABSTRACT

A transmission wheel arrangement includes a shaft and a transmission wheel having a hub and rotatably arranged on the shaft. An axial bearing and a radial bearing are arranged axially and radially respectively between the hub of the transmission wheel and the shaft.

15 Claims, 3 Drawing Sheets

(56) References Cited

FOREIGN PATENT DOCUMENTS

| | | | | |
|---|---|---|---|---|
| EP | 0597438 | B1 * | 5/1994 | |
| EP | 2360382 | A2 * | 8/2011 | |
| EP | 2434150 | B1 * | 5/2012 | ............. F16C 19/54 |
| GB | 1223471 | * | 7/1968 | |
| GB | 2054767 | A * | 2/1981 | |
| WO | WO 2008131721 | A3 * | 12/2008 | ............. F16C 19/38 |
| WO | WO 2011006840 | A1 * | 1/2011 | ............. F16C 13/02 |

* cited by examiner

TRANSMISSION WHEEL ARRANGEMENT

CROSS-REFERENCE TO RELATED APPLICATION

This application claims priority to German Patent Application No. 10 2012 007 972.9, filed Apr. 20, 2012, which is incorporated herein by reference in its entirety.

TECHNICAL FIELD

The technical field relates to a transmission wheel arrangement for transmitting torque in a transmission.

BACKGROUND

In transmissions, as well as in vehicle transmission, transmission wheel arrangements are provided in order to be able to transmit torques from a shaft to another shaft. Such a transmission wheel, in some cases also described as gear wheel, is arranged rotatably mounted on a shaft, wherein usually a radial and an axial mounting is provided, in order to position and mount the transmission wheel durably and in a functionally secure manner.

In known transmission wheel arrangements, the transmission wheel is radially mounted on the shaft by means of radial bearings between the hub of the transmission wheel and the shaft, wherein laterally next to the hub of the transmission wheel an axial bearing is provided, which brings about the axial mounting between the transmission wheel and a shoulder of the shaft.

Thus it is necessary to divide the available installation space for the transmission wheel and the axial bearing. This brings about a shortening of the installation length of the transmission wheel in the region of the wheel hub.

It is at least one object herein to provide a transmission wheel arrangement that is simple yet designed in an installation space-optimized manner. In addition, other objects, desirable features and characteristics will become apparent from the subsequent summary and detailed description, and the appended claims, taken in conjunction with the accompanying drawings and this background.

SUMMARY

According to an exemplary embodiment, a transmission wheel arrangement with a transmission wheel and a shaft is provided. The transmission wheel is rotatably arranged on the shaft, wherein for mounting the transmission wheel both one or more axial bearing as well as one or more radial bearing are provided. The axial bearing as well as the radial bearing are radially arranged between the hub of the transmission wheel and the shaft. Because of this, the axial bearing can be arranged in an installation space-neutral manner seen in axial direction, which does not shorten the installation length of the hub of the transmission wheel. This advantageously brings about that the entire length of the available installation space can be utilized for the wheel hub, which brings about an improved radial mounting, which increases the durability of the transmission wheel.

Here it is advantageous when two radial bearings are provided, wherein the axial bearing is arranged between the two radial bearings seen in axial direction. Because of this, the radial mounting can be improved since the forces are distributed over a wider base in radial direction.

In addition it is likewise advantageous when the shaft comprises a region of a first outer diameter and a region of a second outer diameter, if appropriate subject to using a bearing inner ring. In an embodiment, the transmission wheel comprises a region of a first inner diameter and a region of a second inner diameter, wherein the one radial bearing is arranged in the region of the first diameters, inner and outer diameters, and the second radial bearing is arranged in the region of the second diameters, inner and outer diameters. Here, the shaft can also have a continuous outer diameter, wherein in the region of the second outer diameter the bearing is arranged with bearing inner ring, so that the bearing inner ring makes available the second outer diameter.

In a further embodiment the first outer diameter is smaller or larger than the second outer diameter, wherein the first inner diameter is smaller or larger than the second inner diameter.

In another embodiment, between the first region and the second region of the transmission wheel and the shaft, at least one shoulder each is provided, which comprises an annular surface extending in radial direction. If instead of the shoulder a bearing inner ring is used on the shaft, the shaft can also be provided with a continuous diameter.

In an embodiment, the axial bearing axially supports itself between an annular surface of the shaft and an annular surface of the transmission wheel.

In another embodiment, between at least one annular surface of the transmission wheel and/or of the shaft and the axial bearing, a support disc is provided.

The transmission wheel is axially supported on an axial end face of a support ring, in an embodiment.

In a further embodiment, between the transmission wheel and the support ring, a further axial bearing is provided.

The axial bearing and/or the further axial bearing are/is an axial needle bearing, in an embodiment.

In another embodiment, the axial bearing and/or the further axial bearing is a slide bearing.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
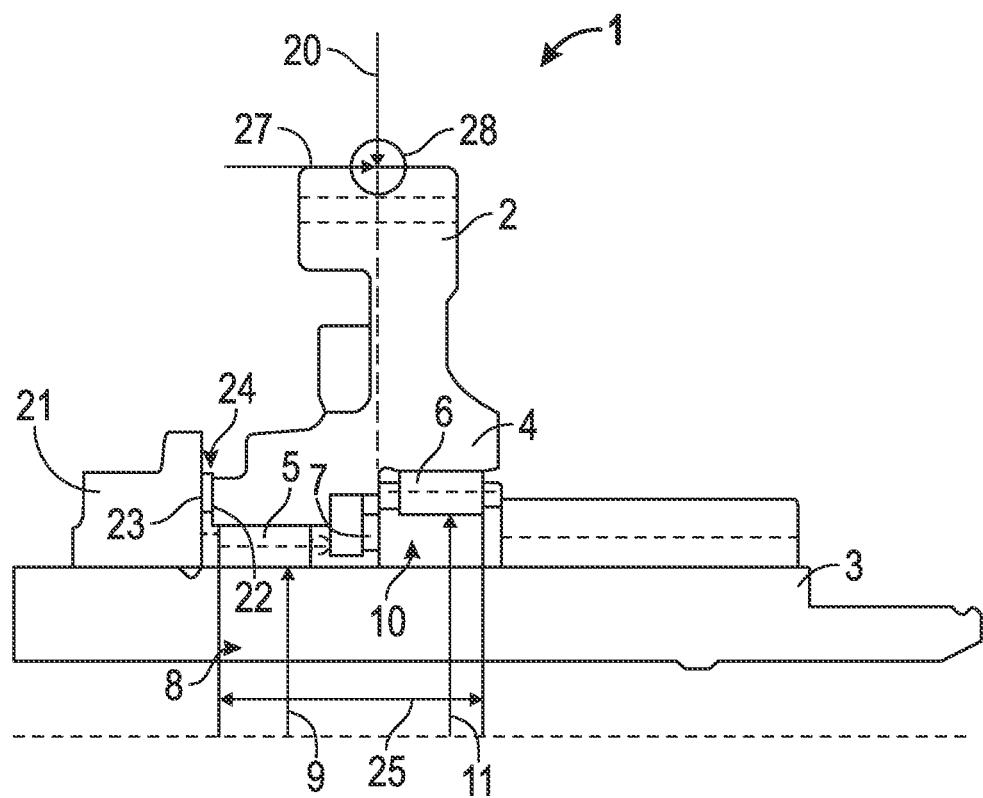
FIG. 1 is a cross-sectional view of a transmission wheel arrangement with an axial bearing between the hub of the transmission wheel and the shaft in accordance with an exemplary embodiment.

FIG. 1 shows details of a half section of a transmission wheel arrangement 1 with a transmission wheel 2 and a shaft 3 in accordance with an exemplary embodiment. Here, the transmission wheel, which in some cases can also be described as gear wheel, is rotatably arranged on the shaft 3. The transmission wheel 2 comprises a radially outer region with teeth and a radially inner region, which is also described as hub 4. Between the hub 4 of the transmission wheel 2 and the shaft 3, preferably two radial bearings 5, 6 and an axial bearing 7 are arranged. Here it is evident in FIG. 1 that the two radial bearings 5, 6 and the axial bearing 7 are radially arranged between the hub 4 of the transmission wheel 2 and the shaft 3. With another exemplary embodiment, more than two radial bearings can also be provided as a modification.

Figure 2:
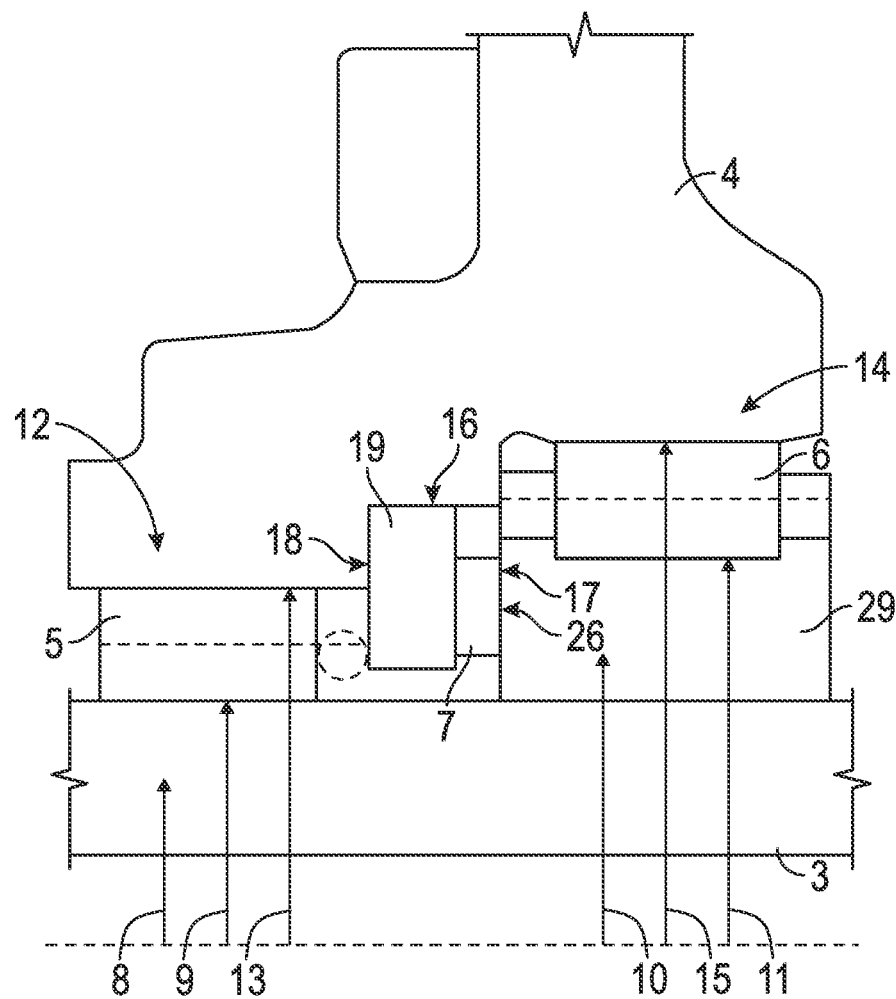
FIG. 2 is an enlarged representation of FIG. 1.

In the exemplary embodiment of FIGS. 1 and 2, the axial bearing 7 is axially arranged between the two radial bearings 5 and 6.

In the FIGS. 1 and 2 it is evident that the shaft 3 comprises a region 8 of a first outer diameter 9 and a region 10 of a second diameter 11, wherein the transmission wheel 2 comprises a region 12 of a first inner diameter 13 and a region 14 of a second inner diameter 15, wherein in the exemplary embodiment according to FIG. 2 the first region with the inner diameter 13 and with the outer diameter 9 is configured with respect to the second region with the inner diameter 15 and with the outer diameter 11 in such a manner that the diameters 9, 13 of the first region 8, 12 are smaller than the diameters 11, 15 of the second region 10, 14. The diameter 11 of the region with the larger diameter in the FIGS. 1 and 2 can also be realized by using a bearing inner ring 29 that is connected to the shaft 3 in a fixed manner. With respect to the diameter, reference is also made to FIG. 2, which shows a detail according to FIG. 1 as enlargement, wherein the size relationships of the diameters or the radii in this respect are more clearly evident than in FIG. 1.

As is evident in FIG. 1 and in FIG. 2, the radial bearings 5, 6 are each arranged in the first region and in the second region respectively in such a manner that the radial bearing 5 is arranged in the region of the smaller outer and inner diameters 9, 13 than the radial bearing 6, which is arranged in the region of the larger inner and outer diameters 11, 15. The radial bearing 5 is thus radially arranged further inside than the radial bearing 6.

Between the two mounting regions for the radial bearings 5, 6, the shaft 3 or if appropriate an additional bearing inner ring forms a shoulder 26, wherein in this region the transmission wheel 2 also forms a shoulder 16. In this exemplary embodiment the shoulder 16 is formed by a double step, wherein it can also be preferred that the shoulder 16 in a further exemplary embodiment is formed by only one step. The shoulder 26 of the shaft 3 or of an additional bearing inner ring 29 however is formed by a single step, wherein with other exemplary embodiments a double or multiple step could also be provided here.

As is evident, the axial bearing 7 is axially arranged between the shoulder 26 and the shoulder 16 axially between the two bearings 5, 6, wherein the axial bearing 7 supports itself at least indirectly on an annular surface 17 of the shoulder 26 as well as on an annular surface 18 of the shoulder 16, wherein between the axial bearing 7 and the annular surface 18 of the hub of the transmission wheel 2 a support disc 19 is provided.

The support disc 19 is dimensioned in such a manner that it axially abuts in the region of the annular surface 18 of the shoulder 16 and radially outside abuts in the region of the shoulder 16, so that the axial force, which acts between the support disc 19 and the axial bearing 7, is absorbed via the annular surface 18. At the same time, the axial bearing 7 supports itself in axial direction in the region of the annular surface 17 of the shoulder 26.

Through the configuration of the shoulders or steps described above and of the regions of different diameter between the shaft 3 and the hub 4 of the transmission wheel 2 described above, a space region can be provided between the two axial bearings 5, 6 in which the axial bearing 7 can be arranged. Because of this it can be achieved that the width of the hub 4 of the transmission wheel 2 that is available can be substantially utilized completely in order to distribute the radial bearings 5, 6 over an optimal width, while the axial bearing 7 is axially arranged between the two radial bearings. Advantageously, this brings about that the forces which act in radial, axial and/or tangential direction on the transmission wheel 2 according to the arrows 20, 27 and 28 result in a reduced transmission wheel tilting than with a narrower arrangement of the hub 4 and of the radial bearings 5, 6. Here, the symbol for 28 represents an arrow 28 emerging from the drawing plane.

FIG. 1, furthermore according to an embodiment, shows a so-called sleeve carrier as support ring 21 adjacent to the transmission wheel 2 in axial direction, which is preferably arranged rotationally fixed to the shaft 3 or can be connected to the latter, wherein between an axial inner surface 22 and the axial surface 23 an axial bearing 24 is arranged. Here, this axial bearing 24 is preferably designed as slide bearing or as a slim-construction needle bearing.

The axial bearing 7 in order to be installation space saving could likewise be designed as axial needle bearing. Alternatively, a slide bearing design or another probably slim-construction design could also be advantageous.

FIGS. 1 and 2 show an exemplary embodiment in which the inner and outer radii of shaft 3 and transmission wheel 2 are matched so that the region of the smaller diameters is arranged adjacent to the support ring 21. In a further exemplary embodiment it can also be advantageous when the arrangement of the region of the larger diameters is arranged adjacent to the support ring 21.

Figure 3:
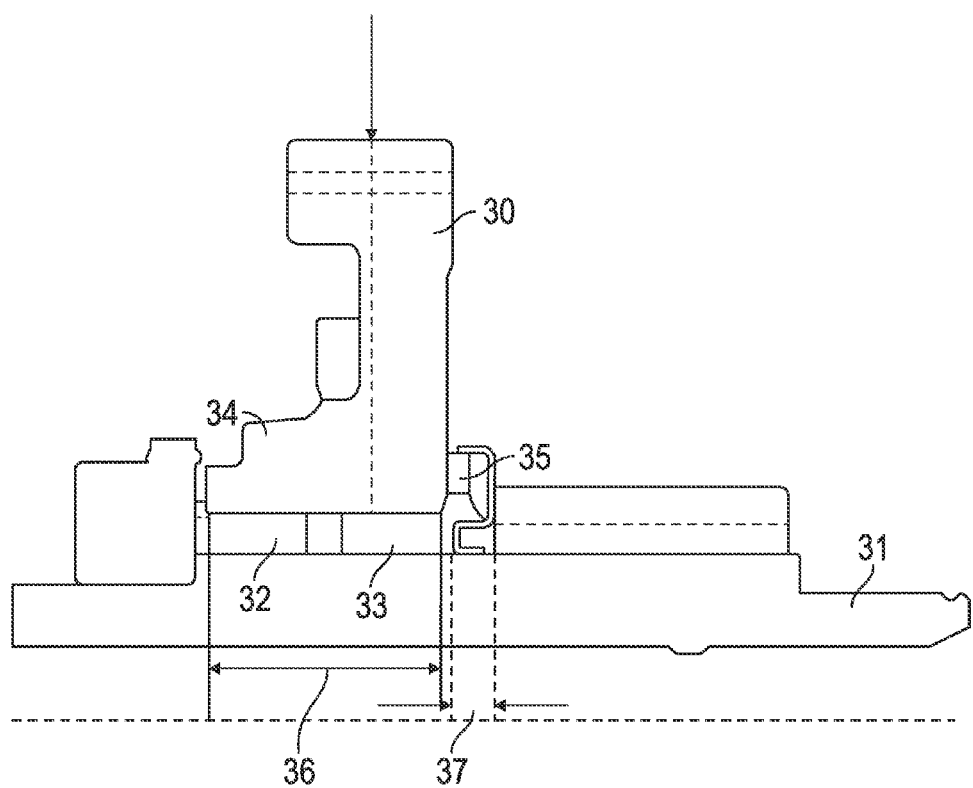
FIG. 3 is a cross-sectional view of a bearing arrangement with an axial bearing axially next to the transmission wheel in accordance with an exemplary embodiment.

In accordance with another embodiment, FIG. 3 shows an arrangement of a transmission wheel 30 on a shaft 31, in which the two radial bearings 32, 33 are radially arranged between the shaft 31 and the hub 34 of the transmission wheel 30, wherein the axial bearing 35 is arranged laterally next to the transmission wheel 30 and supports itself on a lateral end face of the transmission wheel 30. As is evident, the available axial installation space 36 is shorter by the amount 37 than the axial installation space 25 that is available in FIG. 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A transmission wheel arrangement comprising:
    a shaft;
    a transmission wheel having a hub and rotatably arranged on the shaft;
    an axial bearing;
    a first radial bearing; and
    a second radial bearing,
    wherein the axial bearing and the first and second radial bearings are arranged axially and radially respectively between the hub of the transmission wheel and the shaft, and
    wherein the axial bearing is arranged between the first and second radial bearings when viewed in an axial direction.

2. The transmission wheel arrangement according to claim 1, wherein the second radial bearing is offset from the first radial bearing in a radial direction.

3. The transmission wheel arrangement according to claim 1,
wherein the shaft has a region of a first outer diameter and a region of a second outer diameter,
wherein the transmission wheel has a region of a first inner diameter and a region of a second inner diameter,
wherein the first radial bearing is arranged in the region between the first outer diameter and the first inner diameter,
wherein the second radial bearing is arranged in the region between the second outer diameter and the second inner diameter, and
wherein the second outer diameter is greater that the first inner diameter.

4. The transmission wheel arrangement according to claim 3, wherein the region of the second outer diameter and the second inner diameter is formed through a bearing inner ring.

5. The transmission wheel arrangement according to claim 3, wherein the first outer diameter is smaller than the second outer diameter, and wherein the first inner diameter is smaller than the second inner diameter.

6. The transmission wheel arrangement according to claim 3, wherein between the first region and the second region of the transmission wheel and the shaft or of a bearing inner ring, at least one shoulder each is provided, which comprises an annular surface extending in radial direction.

7. The transmission wheel arrangement according to claim 6, wherein the axial bearing is axially supported between an annular surface of the shaft or of the bearing inner ring and an annular surface of the transmission wheel.

8. The transmission wheel arrangement according to claim 7, further comprising:
a support disc provided between at least one annular surface of the transmission wheel and/or of the shaft and/or of the bearing inner ring and the axial bearing.

9. The transmission wheel arrangement according to claim 3, wherein the first outer diameter is larger than the second outer diameter, and wherein the first inner diameter is larger than the second inner diameter.

10. The transmission wheel arrangement according to claim 3, wherein the axial bearing is arranged in another region between the first outer diameter and the second inner diameter.

11. The transmission wheel arrangement according to claim 1, wherein the transmission wheel is axially supported on an axial end face of a support ring.

12. The transmission wheel arrangement according to claim 11, further comprising:
a further axial bearing provided between the transmission wheel and the support ring.

13. The transmission wheel arrangement according to claim 12, wherein at least one of the axial bearing and the further axial bearing is an axial needle bearing.

14. The transmission wheel arrangement according to claim 12, wherein at least one of the axial bearing and the further axial bearing is a slide bearing.

15. The transmission wheel arrangement according to claim 1, wherein the transmission wheel is rotatably arranged on the shaft with a bearing inner ring.

* * * * *